United States Patent [19]

Strauch et al.

[11] Patent Number: 5,533,678

[45] Date of Patent: Jul. 9, 1996

[54] METHOD FOR THE PRODUCTION OF CARBONATES BY WET GRINDING

[75] Inventors: Dieter Strauch, Zofingen; Peter Belger, Muehlethal, both of Switzerland

[73] Assignee: Pluess-Staufer AG, Oftringen, Switzerland

[21] Appl. No.: 177,060

[22] Filed: Jan. 5, 1994

[30] Foreign Application Priority Data

Jan. 19, 1993 [DE] Germany ............... 43 01 257.4

[51] Int. Cl.[6] .................................................. B02C 23/18
[52] U.S. Cl. .................................... 241/16; 241/29
[58] Field of Search ............................ 241/16, 29, 20

[56] References Cited

U.S. PATENT DOCUMENTS

| | | | |
|---|---|---|---|
| 4,293,097 | 10/1981 | Lewis et al. | 241/16 |
| 4,325,514 | 4/1982 | Hemingsley | 241/16 |
| 4,834,301 | 5/1989 | Inkyo et al. | 241/33 |
| 5,407,140 | 4/1995 | Lofthouse et al. | 241/21 |
| 5,432,239 | 7/1995 | Egraz et al. | 241/16 X |

*Primary Examiner*—John M. Husar
*Attorney, Agent, or Firm*—Townsend and Townsend and Crew

[57] ABSTRACT

A method for the production of natural and/or synthetic carbonates, and more particularly calcium carbonates, with a high BET/$N_2$ specific surface area of over 20 $m^2/g$, and more particularly of between 20 to 50 $m^2/g$, utilizes an inherently known mill such as an agitating ball mill. The carbonates in an aqueous suspension are wet ground and the entire suspension is recirculated; that is, subjected to additional wet grinding, until the final product has the desired specific surface area. Furthermore, the solids concentration during the entire duration of the wet grinding operation is maintained at no more than 24% by weight. The products of the method have surprisingly valuable properties and can be employed in the plastics industry, in sealants, in the rubber industry, in printing inks, in cosmetics, in pharmaceuticals, in cigarette paper, in wood varnishes, in high gloss paper and in plastisols.

11 Claims, No Drawings

METHOD FOR THE PRODUCTION OF CARBONATES BY WET GRINDING

BACKGROUND OF THE INVENTION

The invention relates to a method for the production of natural and/or synthetic carbonates and more particularly calcium carbonates, with an extremely high BET/$N_2$ specific surface area utilizing an inherently known mill and more particularly an agitating ball mill by wet grinding. Furthermore, the invention relates to an advantageous use of the products of the method.

The wet grinding of carbonates has long been known. Wet grinding is a grinding operation using a liquid vehicle, that is to say a grinding operation in a liquid suspension. Wet grinding generally requires a smaller amount of energy for a given amount of material to be ground, since the viscosity of the liquid, which is greater than that of air, as a vehicle creates more favorable conditions for the transmission of force to the particles to be ground. Simultaneously wet grinding offers the advantage of dust-free grinding.

Mills so far required therefor and more particularly agitating ball mills are also familiar in the art. They generally consist of an either vertically or horizontally arranged, cylindrical grinding container with an axially extending high speed agitating shaft which bears a plurality of agitating arms or agitating disks. The grinding container is charged with grains of sand, steel balls or steatite balls or with similar grinding bodies with dimensions between some tenths of a millimeter to some millimeters. The suspension of material to be ground flows through the grinding space continuously from the bottom to the top or, respectively, from the front to the back and is comminuted by the compressive and the shear-forces between the grinding bodies thrown up by the agitator. The high speed agitator is arranged at the axis. In the upper part or, respectively, in the rear part a screen or a restriction in the form of a gap prevents the escape of grinding bodies. The fineness of grinding is dependent on the type of grinding body and the degree of charging, the ratio between the diameters of the grinding bodies and particle size of the material to be ground, the type of material to be ground, the type of agitating elements and the mean residence time of the suspension in the grinding space.

U.S. Pat. No. 2,323,550, especially the drawing, discloses a method in which oversize product leaving a ball mill is returned into the mill with the purpose of achieving products with a desired specific surface area of, for instance, 20,000 square feet per pound (see the specification, page 4, lines 41 and 42 of that patent). In this respect, however, only that part of the suspension is returned which has not attained the desired particle size. It is consequently not a question grinding with a circulation. The solids content of the suspension is in this method between 30 and 35% (see page 6, right column, lines 51 and 52 of that patent).

European patent publication 83112004.3 (publication number 0 115 586) also discloses a method for the wet grinding of natural and/or synthetic carbonates. In column 1, lines 8 ff of this publication there is a recommendation, which is in line with the general way of thinking in the art, to maintain the maximum possible solids content in the aqueous carbonate suspension to ensure a good grinding effect.

Patent publications GB-1,123,219 and GB-1,309,074 disclose the grinding of a wet calcium carbonate suspension which has a solids content of at least 25% by weight.

SUMMARY OF THE INVENTION

One object of the present invention is to produce carbonates and more particularly natural calcium carbonates, which have an extremely high BET/$N_2$ specific surface area of over 20 $m^2/g$ and more especially 20 to 50 $m^2/g$.

In order to achieve this object the method is characterized in that the wet grinding is performed in a circulation, i.e. by recycling the product leaving the mill into the mill, until the final product has the desired specific surface area and, furthermore, in that the solids concentration during the entire duration of the wet grinding operation is smaller than or equal to 24% by weight.

The solids concentration preferably amounts to 10 to 24% by weight.

Preferably the grinding operation is performed without dispersing agents. However, in accordance with the invention it is also possible to employ dispersing agents. The use of dispersing agents makes a longer grinding operation possible owing to the low viscosity. Consequently it is possible to achieve specific surface areas of over approximately 40 $m^2/g$.

Contrary to recommendations made in the art, the invention uses extremely low concentration of solids of $\leq 24\%$ by weight, and preferably of 22, of 20, of 18, of 16 or even of only 12% by weight. Unlike the prior art reviewed above the entire ground suspension removed, and not merely a part thereof, is recycled.

Further advantages and features of the invention will be gathered from the following description of working embodiments thereof.

DESCRIPTION OF THE PREFERRED EMBODIMENTS

All degrees of fineness specified herein for the products of the invention were determined by sedimentation analysis in the gravitational field using a SEDIGRAPH 5000 instrument of Micromeritics, U. S. A.. This instrument is known to those in the art and is employed world-wide for the determination of the degree fineness of fillers and pigments. Measurement is performed in a 0.1% by weight aqueous $Na_4P_2O_7$ solution. The dispersion of the samples was performed using a high speed agitator and ultrasound.

The particle distribution as measured was plotted using a X-Y plotter as a throughput summation curve (see for instance Belger, P., Schweizerische Vereinigung der Lackund Farben-Chemiker, XVII FATIPEC Congress, Lugano, 23th to 28th Sep. 1984), the X axis representing the particle diameter of a respective sphere diameter and the Y axis representing the fraction of particles in percent by weight.

The specific surface area was measured using the BET procedure described in the German Standard DIN 66132. The sample, which was pre-dried at 105° C. until a constant weight was reached, was baked at 250° C. under thermostatic control for one hour while being flushed with nitrogen. Measurement was performed with nitrogen ($N_2$) as a measuring gas with cooling by liquid nitrogen.

As used herein the wording "solids concentration" denotes, as expressed in percentage by weight, the content of absolutely dry calcium carbonate in the aqueous suspension.

EXAMPLE 1

For the production of test product a commercially available marble with an upper size limit of 15 μm and a mean section particle diameter of 2.5 μm was the starting material.

Firstly an aqueous suspension with a solids content of 20% by weight was prepared from this starting material.

35 liters ("l") of this suspension were finely ground in a commercially available bead mill with a grinding volume of 12 l.

The peripheral velocity of the grinding disks was 10 m/sec.

Grinding balls: 18 kg of glass grinding balls with a diameter of 1 mm.

Throughput rate 1 l/min.

Duration of grinding 15 passes.

No dispersing agent was added.

After 5, 6, 7, 10 and 15 passes (expressed as "D1" for short) samples were taken.

The degrees of fineness achieved are compiled in the following table I.

TABLE I

| Tests | Degree of fineness <2 μm | (SEDIGRAPH 5000) | | | BET/N$_2$ spec. surf. |
|---|---|---|---|---|---|
| | | <1 μm | <0.5 μm | <0.2 μm | |
| 5 D1 | >99% | 94% | 58% | 18% | 20.2 m$^2$/g |
| 6 D1 | >99% | 97% | 65% | 24% | 22.8 m$^2$/g |
| 7 D1 | >99% | 98% | 72% | 26% | 24.3 m$^2$/g |
| 10 D1 | >99% | 98% | 83% | 31% | 30.7 m$^2$/g |
| 15 D1 | >99% | 99% | 93% | 51% | 39.8 m$^2$/g |

EXAMPLE 2

Using the same starting materials as in example 1 an aqueous suspension with a solids concentration of 18% by weight was produced and further tests were run in the same bead mill.

Conditions in which the tests differed from example 1:

Peripheral velocity of the grinding disks: 12 m/sec.

Duration of grinding: after 2 passes the operation was switched over to grinding with recycling for 4½ hours.

After 2 passes and after 1, 2, 4 and 4½ hours of grinding with recycling samples were taken.

The degrees of fineness are compiled in the following table II.

TABLE II

| Tests | Degree of fineness <1 μm | (SEDIGRAPH 5000) | | BET/N$_2$ spec. surf. |
|---|---|---|---|---|
| | | <0.5 μm | <0.2 μm | |
| 2 D1 | >61% | 25% | 4% | 9.4 m$^2$/g |
| +1 h. | >85% | 52% | 16% | 17.2 m$^2$/g |
| +2 h. | >90% | 69% | 25% | 21.5 m$^2$/g |
| +3 h. | >97% | 79% | 33% | 27.2 m$^2$/g |
| +4½ h. | >99% | 90% | 39% | 29.0 m$^2$/g |

(D1 = pass)

EXAMPLE 3

For the production of test products a commercially available dolomite with an upper size limit of 12 μm and a mean particle diameter of 2.1 μm was utilized as a starting material. Using this starting material an aqueous suspension of 16% by weight was prepared and a further test was run in the same bead mill.

All conditions of grinding were the same as in example 1.

Samples were taken after 2, 5, 10 and 13 passes.

The degrees of fineness achieved are indicated in the following table III.

TABLE III

| Tests | Degree of fineness <1 μm | (SEDIGRAPH 5000) | | BET/N$_2$ spec. surf. |
|---|---|---|---|---|
| | | <0.5 μm | <0.2 μm | |
| 2 D1 | 62% | 20% | 1% | 8.5 m$^2$/g |
| 5 D1 | 90% | 55% | 15% | 16.0 m$^2$/g |
| 10 D1 | 95% | 82% | 29% | 24.2 m$^2$/g |
| 13 D1 | 97% | 91% | 40% | 27.1 m$^2$/g |

EXAMPLE 4

For the production of test products a commercially available marble with an upper size limit of 10 μm and a mean particle diameter of 1.9 μm was the starting material. Using this starting material an aqueous suspension with a solids concentration of 24% by weight was produced and a further test was performed in the same bead mill.

Test conditions different to those of example 1.

Duration of grinding: 19 passes.

Prior to the start of grinding 0.6% by weight (absolutely dry to absolutely dry) of the Polysalz S (sodium polyacrylate supplied by BASF) was added as a dispersant.

Samples were taken after 2, 5, 10, 13 and 19 passes.

The degrees of fineness achieved are compiled in the following table IV.

TABLE IV

| Tests | Degree of fineness <1 μm | (SEDIGRAPH 5000) | | BET/N$_2$ spec. surf. |
|---|---|---|---|---|
| | | <0.5 μm | <0.2 μm | |
| 2 D1 | 72% | 30% | 9% | 14.1 m$^2$/g |
| 5 D1 | 94% | 53% | 15% | 22.3 m$^2$/g |
| 10 D1 | 100% | 85% | 39% | 33.6 m$^2$/g |
| 13 D1 | 100% | 92% | 51% | 37.2 m$^2$/g |
| 19 D1 | 100% | 100% | 73% | 45.6 m$^2$/g |

The use of dispersants renders a longer duration of grinding possible owing to the low viscosity. Accordingly it is possible to obtain specific surface areas of, for instance, over 40 m$^2$/g.

The products of the method in accordance with the invention may be employed with advantage; in polymers, more particularly hard PVC, in sealants, as semi-reinforcing fillers for the rubber industry, as fillers in printing inks, as vehicles in cosmetics and pharmaceuticals and in cigarette paper.

Furthermore the products of the method in accordance with the invention may be employed with advantage in wood varnishes in order to improve weather resistance, as pigments for high gloss paper after coating with fatty acids or the salts thereof (more particularly stearic acid or calcium stearate) and as fillers for plastisols.

What is claimed is:

1. In a method for the production of a carbonate product, with a desired high BET/N$_2$ specific surface area of at least 20 m$^2$/g which includes preparing a suspension including the product and wet grinding the product in the suspension in an agitating ball mill, the improvement comprising repeating the step of wet grinding of the entire product in the suspension leaving the mill until the product has the desired specific surface area and limiting a product solids concentration in the suspension during all wet grinding steps to no more than 24% by weight.

2. The method as claimed in claim 1, wherein the solids concentration during the wet grinding steps amounts to 10 to 24% by weight.

3. The method as claimed in claim 1, wherein the wet grinding steps are performed with dispersants.

4. The method as claimed in claim 1, wherein the solids concentration during the wet grinding steps is equal to 22% by weight.

5. The method as claimed in claim 1, wherein the solids concentration during the wet grinding steps is equal to 20% by weight.

6. The method as claimed in claim 1, wherein the solids concentration during the wet grinding steps is equal to 18% by weight.

7. The method as claimed in claim 1, wherein the solids concentration during the wet grinding steps is equal to 16% by weight.

8. The method as claimed in claim 1, wherein the solids concentration during the wet grinding steps is equal to 12% by weight.

9. The method as claimed in claim 1, wherein the throughput rate for an agitating ball mill with a capacity of 12 l is 1.0 l/min±0.05 l/min.

10. The method as claimed in claim 1 wherein the wet grinding steps are performed without dispersants.

11. In a method for the production of a carbonate product, with a desired high BET/$N_2$ specific surface area of at least 20 $m^2/g$ which includes preparing a suspension including the product and wet grinding the product in the suspension in an agitating ball mill, the improvement comprising removing the suspension including the entire product from the mill, repeating the steps of wet grinding the entire product in the suspension leaving the mill, including product portions therein which already have the desired high BET/$N_2$ specific surface area, removing the suspension including the entire product when the entire product has the desired specific surface area, and limiting a product solids concentration in the suspension during the wet grinding and repeating steps to no more than 24% by weight.

\* \* \* \* \*